United States Patent
Prasad et al.

(10) Patent No.: US 10,111,147 B1
(45) Date of Patent: Oct. 23, 2018

(54) INTELLIGENT CALL TRACKING TO DETECT DROPS USING S1-AP AND SIP SIGNALING

(71) Applicant: NetScout Systems, Inc, Westford, MA (US)

(72) Inventors: Sandeep Prasad, San Jose, CA (US); Abhishek Saraswati, Santa Clara, CA (US); Tauras Liubinskas, Wilmore, KY (US); Erdem Uysal, Westborough, MA (US); Claudio Guerrini, Bagnacavallo (IT); Rajeev Nadkarni, Chelmsford, MA (US); Brandon Wayne Bass, Flower Mound, TX (US)

(73) Assignee: NetScout Systems, Inc., Westford, MA (US)

( * ) Notice: Subject to any disclaimer, the term of this patent is extended or adjusted under 35 U.S.C. 154(b) by 0 days.

(21) Appl. No.: 15/727,409

(22) Filed: Oct. 6, 2017

(51) Int. Cl.
*H04W 36/00* (2009.01)
*H04W 36/16* (2009.01)
*H04W 36/24* (2009.01)
*H04M 3/42* (2006.01)

(52) U.S. Cl.
CPC ......... *H04W 36/16* (2013.01); *H04W 36/245* (2013.01); *H04M 3/42* (2013.01); *H04M 2203/2088* (2013.01)

(58) Field of Classification Search
CPC .................................................... H04W 36/16
USPC ....................................................... 455/436
See application file for complete search history.

(56) References Cited

U.S. PATENT DOCUMENTS

2013/0250942 A1\* 9/2013 Khan .................. H04L 65/1073
370/352

\* cited by examiner

*Primary Examiner* — Joel Ajayi
(74) *Attorney, Agent, or Firm* — Locke Lord LLP; Scott D. Wofsy; Christopher J. Capelli (57) ABSTRACT

A plurality of data packets is received from a wireless communication system. At least one of SIP signaling messages and S1-AP signaling messages associated with calls being made or attempted in the wireless communication system are analyzed for a specified time period to identify one or more dropped calls. At least one of SIP signaling error codes and S1-AP signaling cause codes associated with the identified dropped calls are analyzed to identify one or more call drop reasons. An ASI data set is generated based on the analysis of the at least one of the SIP signaling messages and the S1-AP signaling messages and based on the analysis of the at least one of the SIP signaling error codes and the S1-AP signaling cause codes.

10 Claims, 6 Drawing Sheets

INTELLIGENT CALL TRACKING TO DETECT DROPS USING S1-AP AND SIP SIGNALING

FIELD OF THE INVENTION

This specification is directed, in general, to telecommunications, and, more particularly, to intelligent call tracking to detect drops using S1-Application Protocol (S1-AP) and Session Initiation Protocol (SIP) signaling.

BACKGROUND OF THE INVENTION

The proliferation of internet and mobile-connected devices, the 'Internet of Things', has increased network traffic volume, transmission speeds and usage on communications networks. The ubiquity of device types and connections (cellular, wireless, sensor, multi-SIM, machine-to-machine) and the expansion of usage types (voice, high-definition video, music, data) have also made it more complex to monitor and secure these networks and to conduct analysis on the traffic and content.

To accomplish this, the traffic must be instrumented (what data is moving across the network), analyzed (what is the content of the traffic), and contextualized (what are the implications of this) so a relevant decision can be made or action taken within the available window of opportunity. This is especially so in the case of time-critical security, verification, or revenue impacting situations, and customer, operational, or machine-to-machine impacting events. Examples of such events include fraud occurring on mobile carrier networks and cellular zones dropping calls above an acceptable threshold.

Accordingly, in the absence of strict call continuity enforcement by network operators, there is a need for an improved device mobility solution to prevent dropped calls.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a plurality of data packets is received by a processor from the wireless communication system. At least one of SIP and S1-AP signaling messages associated with calls being made or attempted in a wireless communication system are analyzed for a specified time period to identify one or more dropped calls. At least one of SIP signaling error codes and S1-AP signaling cause codes associated with the identified dropped calls are analyzed to identify one or more call drop reason. An Adaptive Session Intelligence (ASI) data set is generated based on the analysis of the at least one of the SIP and S1-AP signaling messages and based on the analysis of the at least one of SIP signaling error codes and S1-AP signaling cause codes.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. In addition, the present invention is not described with reference to any particular programming language. It will be appreciated that a variety of programming languages may be used to implement the embodiments of the present invention as described herein, and any references below to specific languages are provided for disclosure of enablement of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Embodiments of the present invention relate to monitoring performance of a wireless communications network. In a wireless communications network, a handover is a process for switching from an original radio channel to a new radio channel when a User Equipment (UE) moves from a coverage area of one Base Station (BS) to a coverage area of another BS during a period when the UE communicates with a network side. A radio access technology (RAT) handover process (e.g., UMTS-to-LTE system handover) mainly involves network entities, such as an RNC (radio network controller), an SGSN (serving GPRS support node), an MME (mobility management entity), an eNodeB and so on. To monitor performance of a wireless communication network containing both legacy and modern RAT, a plurality of devices dedicated to monitoring data transmitted over the wireless communication network are configured to monitor call drop rates and provide data indicative of root causes for such dropped calls. The plurality of devices summarizes a plurality of observed data packets into a compact Adaptive Session Intelligence (ASI) data set for storage and processing. The ASI data set provides the analysis granularity required to extract rich network, service- and user-related metrics on devices, subscribers, base station ID, Location Area (LA), Routing Area (RA), QoS, SITE, Access Point Name (APN), Tracking Area Code (TAC), and VLAN. Each record in the ASI data set may be updated in real-time. Depending on protocols, a network monitoring system extracts different sets of information, removes redundant information from the plurality of data packets, and focuses on the various types of performance problems affecting end users of numerous network applications.

In an embodiment of the present invention, the network monitoring system may collect and analyze SIP signaling information to focus on monitoring drop call rates and root cause analysis for various dropped call scenarios. The network monitoring system may retrieve and process multiple ASI data set records for the SIP protocol to identify a situation when predefined supported metrics exceed computed baselines or predefined thresholds (e.g., error message thresholds). The performed analysis enables identification of dropped calls using discrete identification criteria. Hence, the network monitoring system can facilitate more efficient, uniform and effective analysis and troubleshooting of various events related to various dropped calls scenarios.

Overview of System Architecture

Figure 1:
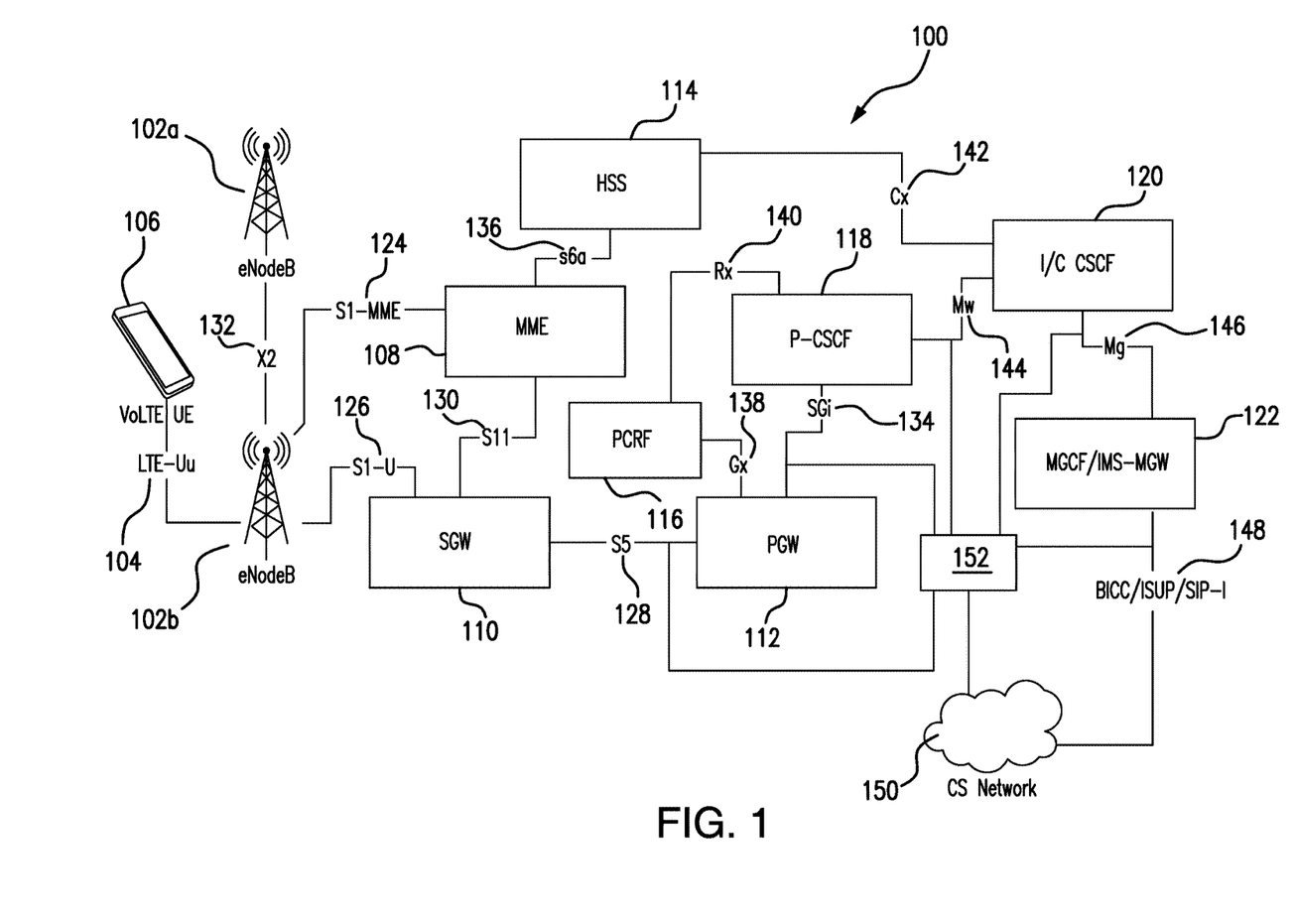
FIG. 1 illustrates the architecture of a system for performance monitoring of Voice over LTE (VoLTE) networks, according to one embodiment of the present invention.

FIG. 1 illustrates the architecture of a system for performance monitoring of Voice over LTE (VoLTE) networks, according to one embodiment of the present invention. It is noted that the VoLTE system of FIG. 1 is merely one example of a possible system, and embodiments may be implemented in any of various systems, as desired.

As shown, the exemplary LTE system includes one or more eNodeBs 102a, 102b which communicates over a transmission medium (LTE Uu interface 104) with one or more user devices 106. User devices may be referred to herein as "user equipment" (UE). Thus, the user devices 106 are referred to as UEs or UE devices. UE devices 106 may comprise any of various types of computer systems or devices which are mobile or portable and which perform wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Figure 2:
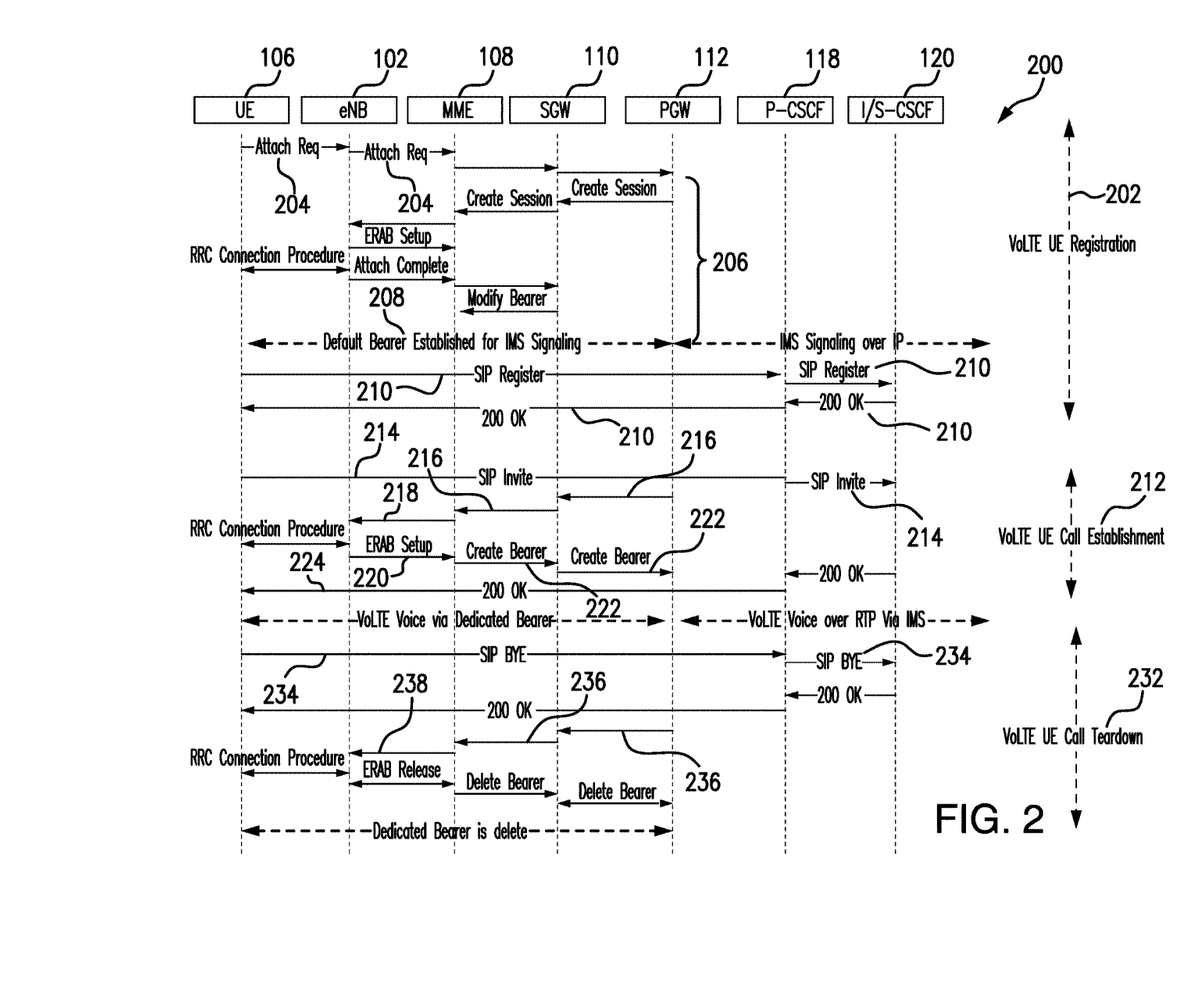
FIG. 2 is a signaling sequence chart illustrating signaling necessary for registration, call establishment and call teardown in VoLTE networks.

Access network 100 may include one or more eNodeBs 102a and 102b (corresponding to respective base stations not shown in FIG. 1), a mobility management entity (MME) 108, a serving gateway (SGW) 110, a packet data network gateway (PGW) 112, a home subscriber server (HSS) 114, among other component. While FIG. 2 depicts a couple of eNodeBs 102a and 102b and a single MME 108, SGW 110, PGW 112, HSS 114, among other components, for illustration purposes, in other implementations, FIGS. 1 and 2 may include more than two eNodeBs 102a and 102b, as well as multiple MMEs 108, SGWs 110, PGWs 112, HSSes 114, etc.

eNodeBs 102a and 102b may include one or more devices (e.g., base stations) and other components and functionality that allow UE 106 to wirelessly connect to access network 100. eNodeBs 102a and 102b may include or be associated with one or more cells. For example, each cell may include a radio frequency (RF) transceiver facing a particular direction. The video stream and the VoLTE call are carried as radio transmissions along LTE-Uu links 104, over which UE devices 106 are attached to one or more cells. eNodeBs 102a and 102b may interface with access network 100 via an interface referred to as an S1 interface, which may be split into a control plane S1-MME interface 124 and a data plane S1-U interface 126. S1-MME interface 124 may interface with MME device 108. S1-MME interface 124 may be implemented, for example, with a protocol stack that includes a Network Access Server (NAS) protocol and/or Stream Control Transmission Protocol (SCTP). An S1-U interface 126 may interface with SGW 110 and may be implemented, for example, using a General Packet Radio Service Tunneling Protocol version 2 (GTPv2).

MME 108 may implement control plane processing for access network 100. For example, MME 108 may implement tracking and paging procedures for UE 106, may activate and deactivate bearers for UE 106, may authenticate a user of UE 106, and may interface to non-LTE radio access networks. A bearer may represent a logical channel with particular quality of service (QoS) requirements. MME 108 may also select a particular SGW 110 for a particular UE 106. A particular MME 108 may interface with other MMEs in access network 100 and may send and receive information associated with UEs 108, which may allow one MME device to take over control plane processing of UEs serviced by another MME, if the other MME becomes unavailable.

SGW 110 is part of the wireless relay which comprises eNodeBs 102a and 102b, Serving Gateway (SGW) 110, Packet Data Security Gateway (PGW) 112 and Policy and Charging Rules Function (PCRF) 116. SGW 110 routes and forwards user data packets. SGW 110 acts as the mobility anchor for the user plane during inter-eNodeB 102a and 102b handovers. PGW 112 and SGW 110 communicate over an LTE S5 link 128. As noted above, SGW 110 and eNodeB 102a and 102b communicate over an LTE S1-U link 126. SGW 110 and MME 108 communicate over an LTE S11 link 130.

According to an embodiment of the present invention, the disclosed monitoring system and method intercepts VoLTE signals when a proxy-call session control function (P-CSCF) 116 and interrogating/serving-call session control function (I/S-CSCF) 120 services are provided by a single device without an exposed link which could be monitored. VoLTE signals include IP Multimedia Subsystem (IMS) signaling (SIP) and media (RTP) bearers. PGW 112 provides connectivity between the UE devices 106 and external packet data networks. In a network, multiple PGWs 112 may handle different application traffic types. The IMS PGW 112 is the path to reach the IMS components, such as the P-CSCF 118 or S-CSCF, which is the call session control function that does voice switching.

The IMS may be generally described as architecture for delivering multimedia services to the UEs 106 using the IP protocol. The IMS may include a variety of components to accomplish this task. For example, a typical IMS includes a Home Subscriber Server (HSS) 114 that stores subscription information for a user of the UEs 106. Thus, when the corresponding UE of the user registers with the IMS (e.g., connects thereto), the subscription information may be utilized to determine various features. For example, this subscription information is used to provide the correct multimedia services to the user such as a VoLTE call. The IMS may communicate with the cellular core network 150 and the Internet (not shown in FIG. 1) to provide the multimedia services to the UEs 106.

The PCRF 116 may determine policy rules in the IMS. The PCRF 116 aggregates information to and from the IMS to support creation of the rules and make policy decisions for the multimedia services performed by the UE 110. With particular regard to the VoLTE call functionality, the PCRF 116 may be a mediator of network resources for the IMS to establish the call and allocate the requested bandwidth to the dedicated bearer.

With specific regard to the VoLTE call functionality, the IMS registration procedure may incorporate the PCRF 116 and the P-CSCF 118. The P-CSCF 118 may be a SIP proxy providing a first point of contact for the UE 106 with the IMS. The P-CSCF 118 may also be disposed on a path of all signaling to inspect each signal ensuring that the UE 106 does not misbehave such as changing a known signaling route or disobeying a routing policy. PGW 112 and P-CSCF 118 communicate over an LTE SGi link 134. Gm reference interface is tunneled within SGi interface 134 for VoLTE services. The Gm interface is used to exchange messages between SIP UE 106 and P-CSCF 118.

As described in greater detail below UEs 106 can register with the IMS network by contacting the P-CSCF 118 which communicates with the I/C-CSCF 120, which in turn, communicates with a Serving CSCF (S-CSCF) to register the UEs 106 with the HSS 114. To initiate a communication session between UEs, an originating IMS UE 106 can submit a Session Initiation Protocol (SIP INVITE) message to an originating P-CSCF 118 which communicates with a corresponding originating S-CSCF. The originating S-CSCF can submit the SIP INVITE message to one or more application servers (ASs) that can provide a variety of services to IMS subscribers.

Media Gateway Control Function/IMS Media Gateway (MGCF/IMS-MGW) 122 is responsible for the control/media plane internetworking at the network interconnect point to circuit-switched networks. This includes interworking to CS networks 150 based on BICC/ISUP/SIP-I 148. The MGCF 122 forwards VoLTE session invitation to a subscriber via the CS network 150.

The X2 interface 132 is a defined interface for providing point-to-point communications between two eNodeBs 102a and 102b within LTE radio access network 100. The X2 interface 132 supports the exchange of signaling information and also supports the forwarding of packets from one eNodeB 102a to another eNodeB 102b via a tunnel. The X2 interface 132 is used by an X2 application protocol, which supports many applications, including mobility management (e.g., handovers); load management; reporting of general error situations; resetting X2; setting up X2; and eNodeB configuration updates.

The S6a interface 136 is used by the MME 108 to retrieve subscriber data from the HSS 114.

The PCRF 116 manages Gx sessions 138 between the PGW 112 and the PCRF 116, and manages Rx sessions 140 between the P-CSCF 118 and the PCRF 116. Gx sessions 138 typically tend to be long-lived sessions. However, the PCRF 116 may experience a Gx session 138 loss due to, for example, software failure, geo-redundancy recovery, etc. associated with the PCRF 116. The PCRF 116 may also experience a message loss, such as, for example, a reauthorization request being dropped due to overload control, message buffer overflow, etc. During the session loss and/or the message loss, the PCRF 116 and the PGW 112 are unable to synchronize session state (e.g., policy control and charging rules status, quality of service (QoS), event triggers, access point name (APN)-aggregate maximum bit rate (AMBR), etc.). This, in turn, results in a poor user experience when a user is attempting to establish voice and/or video calls. For example, the PCRF 116 cannot process an Rx 140 request for a voice/video call when the PCRF 116 has lost state for a corresponding Gx session 138. This may require the user to power cycle the UE 106 or to drop and recreate a Gx connection 138 to establish the voice/video call.

The Cx interface 142 is between the I/C-CSCF 120 and the HSS 114. The Cx interface 142 may be used at the I/C-CSCF element 120 to query the HSS 144 for which S-CSCF element should handle the MSISDN if the user is IMS/VoLTE provisioned. Therefore, the result of this query would indicate whether a MSISDN is provisioned for VoLTE service.

The IMS core interfaces are the Mw interface 144 between the P-CSCF 118 and the I/C-CSCF 120 and the Mg interface 146 between the I/C-CSCF 120 and the MGCF 122.

Core network 150 connectivity is simplified by the introduction of BICC/SIP/SIP-I (Bearer Independent Call Control/Session Initiation Protocol/SIP—with Encapsulated ISUP) and SIGTRAN (MAP) interfaces 148.

The network monitors 152 are hardware, software, firmware or a combination thereof for monitoring data communication at various locations or links of the network 100. Each of the network monitors 152 may be deployed at certain locations or links of the network 100 to collect network data packets traversing the locations or links.

After collecting the network data packets, the network monitors 152 generate ASI data sets based on the received rich packet-flow data, and store the ASI data. The network monitor 152 may be a special purpose computing device or a software component (not limited to a single process) dedicated to monitoring data communicated via the network 100. Alternatively, the network monitor 152 may be a general purpose computing device with specialized software components installed thereon. In one embodiment, the network monitor 152 is embodied as nGenius Collectors, nGenius Probes or nGenius InfiniStream, available from NetScout Systems, Inc. of Westford, Mass.

FIG. 2 is a signaling sequence chart 200 illustrating signaling necessary for registration, call establishment and call tear-down in VoLTE networks. Cell phone carriers operating IMS networks are providing various services to wireless subscribers. One service, known as Advanced Call Feature (ACF), enables user equipment devices 106 to make VoLTE phone calls. As noted above, VoLTE uses IP packets to support voice calls, potentially offering much higher quality calls and faster set-up times, among other things, than traditional 2G services that provide circuit-switched voice calls. As shown in FIG. 2, in order to enable VoLTE phone call functionality, the UE 106 typically performs an LTE attach followed by an IMS registration for VoLTE services 202. The UE device 106 initiates the attach request to the eNodeB 102. It should be noted that in some cases the attach request 204 may be an emergency attach request without user equipment device authentication. The emergency attach request may be a request to make an emergency call. The eNodeB 102 forwards, to the MME 108, the attach request message sent by the UE 106. The attach request message 204 includes user location information. The MME 108 performs a default bearer setup procedure 206 for VoLTE IMS signaling using SGW 110. The default bearer may establish a logical connection for a data flow which may be used to carry IMS control signaling between the IMS network and the UE 106. The default bearer may be associated with an IP address of the UE 106. During the UE registration 202, once a default EPC bearers is created 208 (for SIP signaling transmissions), the UE 106 initiates procedures to register with IMS network, with SIP signaling 210 being transported over default EPC bearers.

The UE 106 performs call establishment 212 by using the IMS network. The IMS network makes use of the SIP to set up and control calls or sessions between UE devices 106 (or UE devices 106 and application servers). The IMS signaling (such as sending, by the UE 106, a SIP registration request for the UE device 106 to the IMS network) is sent over the default bearer, and a new dedicated bearer is dynamically established for the voice traffic. As shown in FIG. 2, the UE 106 initiates the call by sending a SIP INVITE request 214 to the P-CSCF 118. In one embodiment, the address of the P-CSCF function 118 is classically discovered by using information stored in the Internet protocol multimedia services identity module of the UE 106, during a classical packet data network connectivity request, by the dynamic host control protocol procedure and by using a domain name server (not represented in FIG. 2), as defined in 3GPP standards. The P-CSCF 118 sends the SIP INVITE request 214 to I/S-CSCF 120 and may forward it to any other node. Also, another request is sent to the PCRF 116 (shown in FIG. 1) which initiates a create dedicated bearer request 216 to the serving gateway, for example, PGW 112/SGW 110. The SGW 110 forwards the create dedicated bearer request 216 to the MME 108 for establishing dedicated bearer for voice data. The MME 108 sends E-RAB (e-Radio Access Bearer) Setup request message 218 to the eNodeB 102 for dedicated bearer creation. The MME 108 sends to the SGW 110 a create dedicated bearer response message 222 after receiving from the eNodeB 102 an E-RAB Setup response message 220 comprising information about the activated dedicated bearer associated with the communications service. The create dedicated bearer response message 222 includes information about the created dedicated bearer associated with the communications service. The UE 106 receives, from the P-CSCF 118 coupled to the UE 106, the SIP 200 OK message 224 indicating that a call has been established and voice traffic is ready to be sent over the dedicated bearers.

The UE 106, associated with a user and with an IMS session, performs call clearing by using the IMS network and by removing the dedicated bearer that was dynamically established for voice traffic. Call teardown 232 is initiated by the UE 106 by generating and sending a SIP BYE message 234 to the P-CSCF 118 for a VoLTE session. The P-CSCF 118 forwards the SIP BYE message 234 to the I/S-CSCF 120. The P-CSCF 118 also initiates a request for terminating a session to the PCRF for initiating removal of dedicated bearer. A Re-Auth-Request is sent to the PGW 112. The PGW 112 forwards a Delete Bearer Request 236 to the SGW 110. The SGW 110 forwards the Delete Bearer Request 236 to the MME 108. The dedicated MME 108, upon reception of the Delete Bearer Request 236, sends an E-RAB release request 238 to the eNodeB 102 to accomplish removal of the dedicated bearer.

Figure 3:
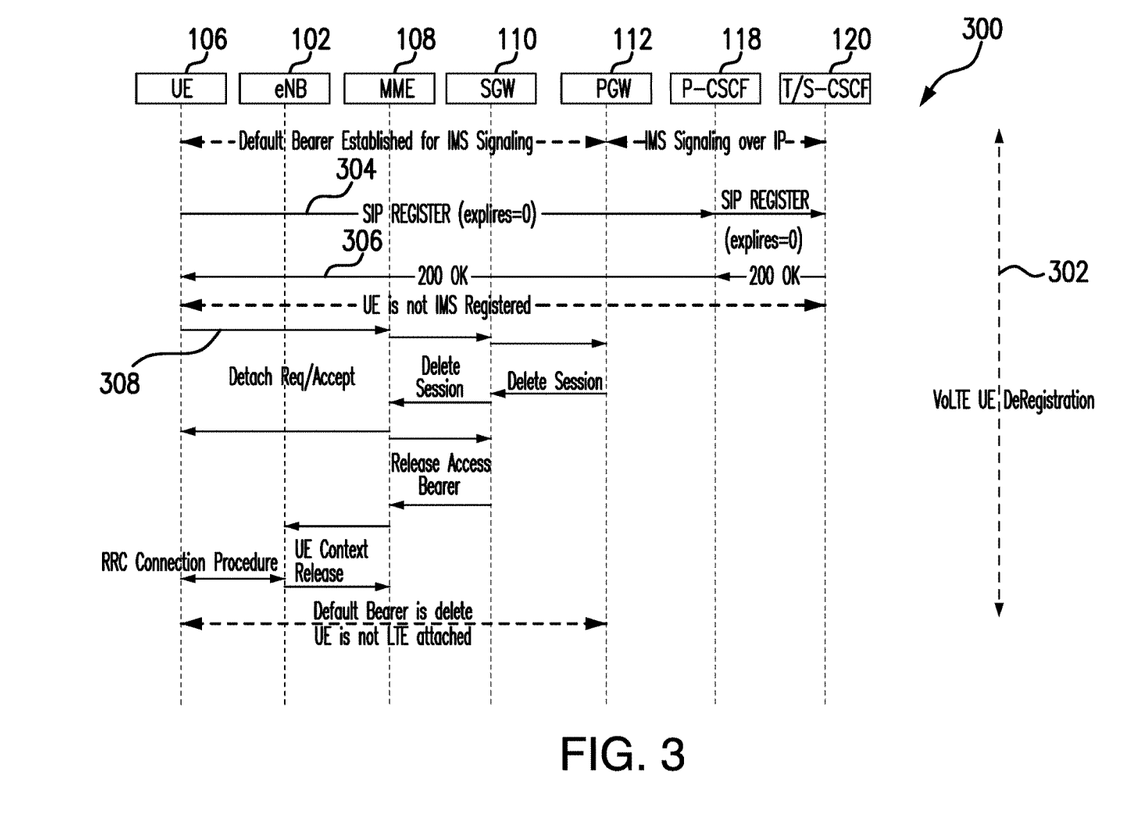
FIG. 3 is a signaling sequence chart illustrating signaling necessary for User Equipment (UE) deregistration in VoLTE networks.

FIG. 3 is a signaling sequence chart 300 illustrating signaling necessary for UE deregistration 302 in VoLTE networks. As shown in FIG. 3, the UE 106 first deregisters from the IMS and then performs LTE detach procedures. The deregistration procedure includes initiating, by the UE 106, a SIP REGISTER message 304, with registration expiration interval timer set to zero, towards the P-CSCF 118. After receiving the 200 OK responses 306, the UE 106 removes all of the registration details for the registered user. Now the UE 106 is effectively deregistered from the IMS network for VoLTE services and no further SIP signaling is being transported over the default EPC bearer. The UE 106 also detaches from the LTE network by initiating a detach request 308 to the MME 108.

As a user of the UE 106 moves during a call, the call will be passed to different devices using different types of handovers. Intra LTE handover may occur between source and target eNodeBs when the UE 106 moves from one cell area managed by a source eNodeB (e.g., first eNodeB 102*a*) to another cell area managed by another target eNodeB (e.g., second eNodeB 102*b*). Both source 102*a* and target 102*b* eNodeBs include an S1 interface 124,126 comprising an interface between the source/target node and a gateway (e.g., MME 108 or SGW 110), an X2 interface 132 which includes an interface between the source eNodeB 102*a* and the target eNodeB 102*b*, and a transceiver which receives data from the S1 interface 124,126 and data from the X2 interface 132. X2 based handover is used if X2 reference is active between the first 102*a* and second 102*b* eNodeBs and the MME 108 is not changed. S1 based handover is used if there is no X2 interface 132 communication between the first 102*a* and second 102*b* eNodeBs or if the MME 108 location is changing. The default SGW 110 relocation may or may not occur during these procedures.

Figure 4:
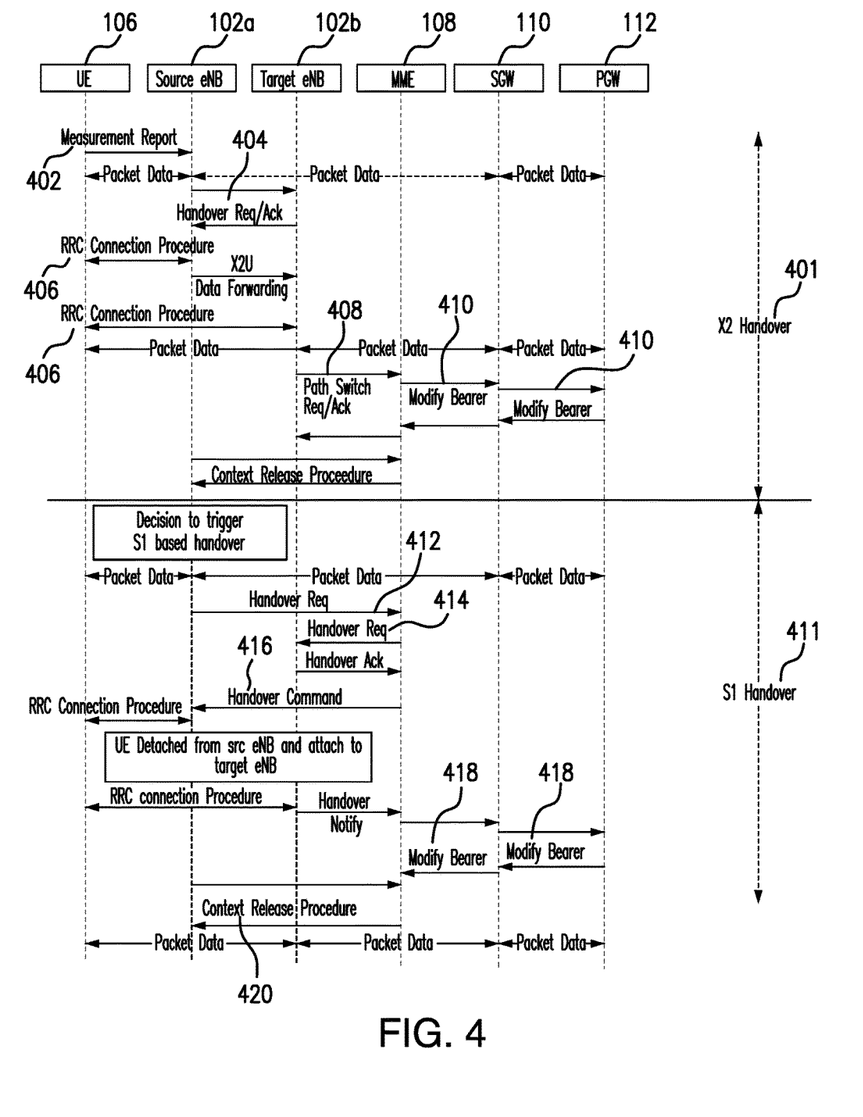
FIG. 4 is a signaling sequence chart illustrating signaling necessary for handover procedures in VoLTE networks.

FIG. 4 is a signaling sequence chart illustrating signaling necessary for handover procedures in VoLTE networks. Based on measurement reports 402, the first (source) eNodeB 102*a* makes a decision to handover the UE 106 to the second (target) eNodeB 102*b*. In a first step, if the X2 interface 132 is available between the first 102*a* and second 102*b* eNodeBs, the first eNodeB 102*a* can use X2 based handover procedure 401. As illustrated, the first eNodeB 102*a* issues a handover request message 404 to the second eNodeB 102*b*. The handover request message 404 can include an EPS bearer group identifier (ID) indicating an EPS group bearer of the first eNodeB 102*a* and associated with the UE 106 and a last UE indicator to indicate whether the UE 106 is a last UE of the first eNodeB 102*a* to use the EPS group bearer. The X2 based handover procedure 401 further includes RRCConnectionReconfiguration 406 (exchanged between the UE 106 and eNodeBs 102*a*, 102*b*), path switch request 408 (exchanged between the second eNodeB 102*b* and the MME 108), modify bearer (exchanged between the MME 108 and the SGW 110, and between the SGW 110 and the PGW 112) messages. At the end of the method for performing X2 based handover 401 of the UE 106, all EPS bearers are switched and reestablished in the second (target) eNodeB 102*b*.

FIG. 4 further illustrates the S1-based handover procedure 411 for the UE device 106 to the second eNodeB 102*b*, which is initiated by the first eNodeB 102*a* sending a handover required message 412 to the MME 108. As illustrated, the S1-based handover procedure 411 further accomplishes the session transfer by using forward relocation (exchanged between a source MME and a target MME, in case of MME relocation) (not shown in FIG. 4), handover request (exchanged between the MME 108 and the second eNodeB 102*b*), handover command (exchanged between the MME 108 and the first eNodeB 102*a*), session create (exchanged between the MME 108 and a target SGW in case of SGW 110 relocation) (not shown in FIG. 4) and modify bearer (exchanged between the MME 108 and the SGW 110 and between the SGW 110 and the PGW 112) messages.

Example Architecture of Network Monitor

Figure 5:
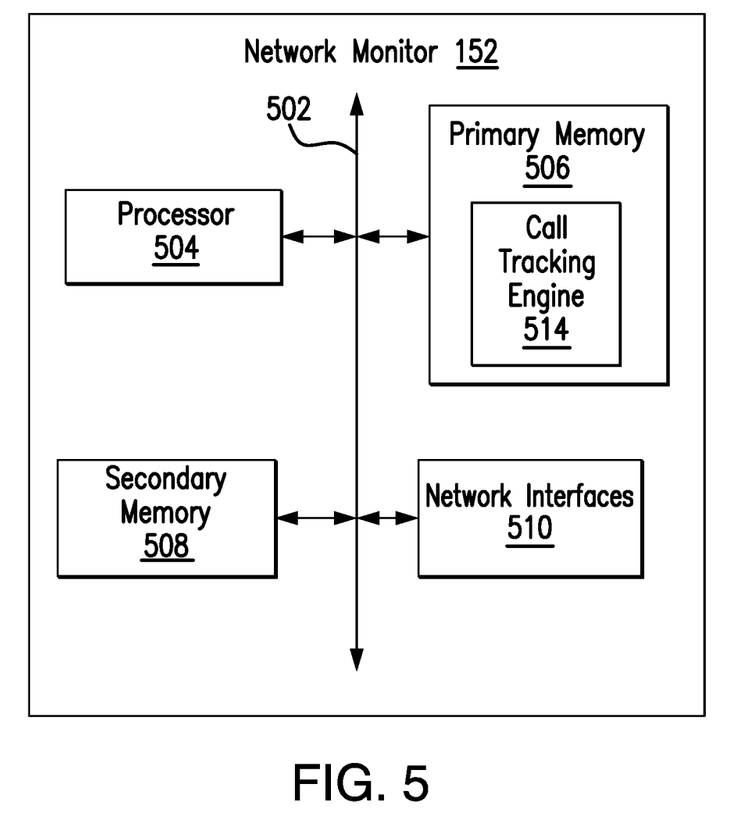
FIG. 5 is a block diagram of the network monitor of FIG. 1, according to one embodiment of the present invention.

FIG. 5 is a block diagram of the network monitor 152, according to one embodiment of the present invention. The network monitor 152 may include, among other components, a processor 504, primary memory 506, secondary memory 508, and one or more network interface(s) 510. These components are connected and communicate via a bus 502. The network monitor 152 may also include other components not illustrated in FIG. 5, such as user input devices (e.g., keyboard and mouse) and display devices (e.g., a display driver card).

The processor 504 executes computer instructions stored in the primary memory 506 and/or the secondary memory 508. Although only a single processor is illustrated in FIG. 2, two or more processors may be used to increase the computing capacity and the processing speed of the network monitor 152.

The primary memory 506 is a computer readable storage medium that stores, among other data, computer instruction modules for processing, storing and retrieving network traffic data. The primary memory 506 may be implemented in various data storage devices (e.g., Random-Access Memory (RAM)) having a faster access speed compared to the secondary memory 508. The faster access speed of the primary memory 506 allows the network monitor 152 to analyze ASI data sets in real time.

The secondary memory 508 may be a secondary storage device for storing, among others, the processed signaling messages and the processed ASI data sets. The secondary memory 508 may be embodied, for example, as a solid-state drive, hard disk or other memory devices capable of storing a large amount of data compared to the primary memory 506.

The network interfaces 510 may include a NIC (network interface card) or other standard network interfaces to receive ASI data sets. For example, the network interfaces 510 may be an Ethernet interface, a WiFi (IEEE 802.11) interface or other types of wired or wireless network interfaces. In one embodiment, two or more network interfaces are used to communicate with different types of wireless networks or perform specialized functions.

Figure 6:
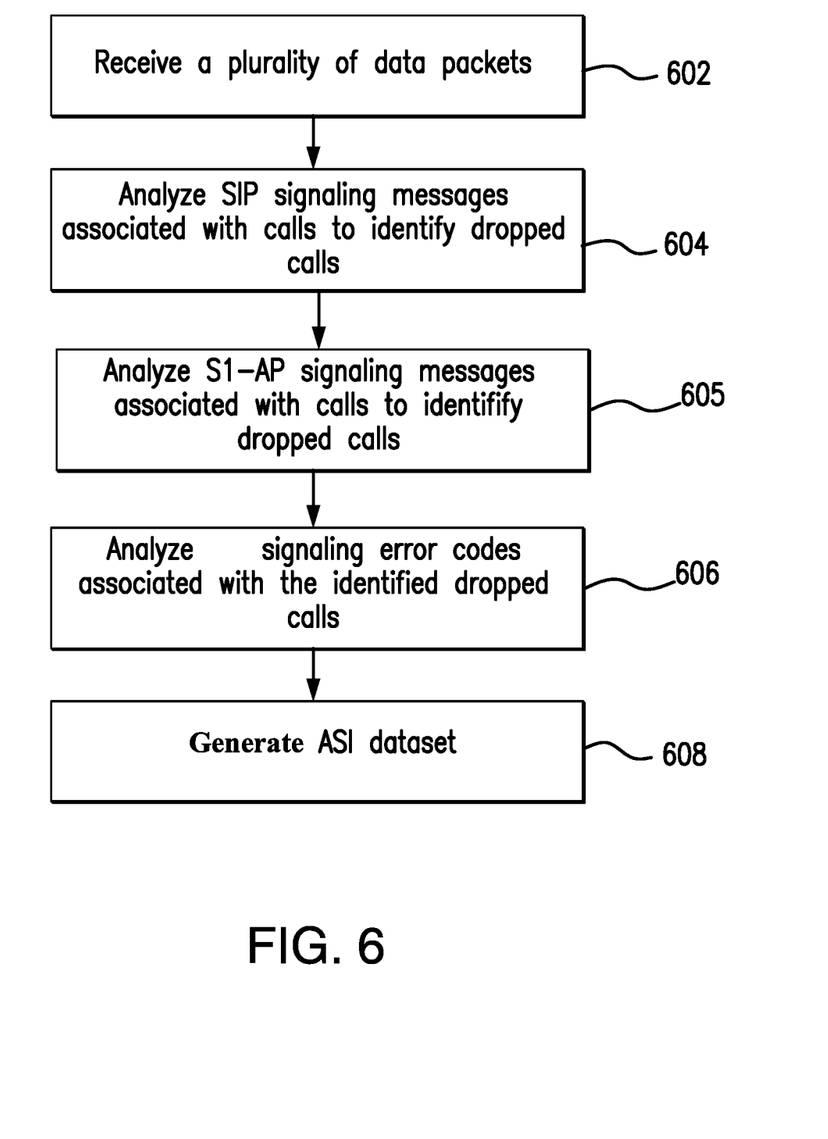
FIG. 6 is a flowchart illustrating a method for tracking a status of a call in a VoLTE network, in accordance with illustrative embodiments of the present invention.

FIG. 6 is a flowchart illustrating a method for tracking a status of a call in a wireless communication network, in accordance with illustrative embodiments of the present invention. Before turning to description of FIG. 6, it is noted that the flow diagrams shown therein is described, by way of example, with reference to components shown in FIGS. 1-5, although these operational steps may be carried out in any system and are not limited to the scenario shown in the aforementioned figure. Additionally, the flow diagram in FIG. 6 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

Dropped calls may occur in a wireless network for different reasons, including, for example, the terrain of the coverage area, equipment problems, atmospheric interference, traveling outside the coverage area and due to errors in various layers of a network. In general, a dropped call occurs when the call is terminated by other than the calling user or the called user. Transmission within the wireless network 100 and terminals (e.g., UE 106) may not be robust enough to maintain the call, thus causing the call to drop. For example, this may occur when the UE 106 moves out of range of the wireless network 100. Also, an active call may not be maintained across a different provider's network (as calls cannot be re-routed over the traditional telephone network while in progress), resulting in termination of the call once a signal cannot be maintained between the terminal and the original network. Another common reason is when the UE 106 is taken into an area where wireless communication is unavailable, interrupted, interfered with, or jammed. From the network's perspective, this is the same as the mobile moving out of the coverage area. Calls may also be dropped upon handoff between cells within the same provider's network. This may be due to an imbalance of traffic within the areas of coverage for different cell sites (base stations). If the new cell site is operating at capacity, it typically cannot accept the additional traffic resulting by the call trying to hand into the cell. For example, a dropped call may occur if network configuration is not properly set up so that the serving cell site is not aware of the targeted cell site during the handoff of the terminal. If the wireless terminal cannot find an alternative cell to support the call, the call may be dropped. According to embodiments of the present invention, the call tracking engine 514 collects different types of data related to calls being made or attempted in the wireless network 100 and identifies one or more call drop reasons for each dropped call, as described below. The call tracking engine 514 handles call drop processing by tracking E-RABs and their assigned QoS class identifiers (QCI) values. Different E-RABs will be created for control and data communication between the wireless access network 100 and the UE 106. It should be noted that data communication can be sent on using the control E-RAB temporarily.

At step 602, the call tracking engine 514 receives a plurality of data packets from the wireless network 100. At step 604, the call tracking engine 514 analyzes SIP signaling messages associated with calls being made or attempted in the wireless communication system 100 for a specified period of time to identify one or more dropped calls. SIP messages include SIP request messages and SIP response messages.

SIP request messages include SIP INVITE 214 (invites client or server to establish a session), SIP ACK 224 (confirmation reception of a final response to an INVITE message 214), SIP BYE 234 (sender wishes to close the session), SIP CANCEL (cancels pending requests), SIP OPTIONS (asks for information about capabilities before establishing a session), SIP REGISTER 210 (informs a location server of the client's IP address). As a non-limiting example, if UE 106 engages in a call with another UE (not shown), a network-initiated call release may occur and, as a result, SGW 110 may receive a SIP BYE message 234. SGW 110 may send a SIP BYE message to the UE 106 notifying the UE 106 of the termination of call.

SIP response messages include 1xx Informational, 2xx Success, 3xx REDIRECTION, 4xx CLIENT ERROR, 5XX SERVER ERROR, 6XX GLOBAL FAILURE. Such SIP response messages use a 3 digit number, e.g. 1xx. The first digit defines the category, while the next two digits allow up to 100 variations, e.g. 200 OK 224 (successful invitation). In one embodiment, the call tracking engine 514, at step 604, analyzes both the SIP BYE messages and the SIP ERROR codes. In one embodiment, the call tracking engine 514 analyzes only error codes predefined by a user. In other words, the call tracking engine 514 may have one or more configurable parameters which provide users an ability to identify error codes that impact call drops and should be used by the call tracking engine 514 for dropped call identification purposes.

The SIP BYE 234 message may be used to convey error information, such as, for example, information about an error resulting from location information inserted in the invite messages sent to one or more communication devices (e.g., UE 106) engaged in a call. For example, if the error is such that a communication connection in the form of a call cannot proceed between the first and second communication devices then the standard according to RFC 3725 recommends that a SIP BYE request message 234 is sent back to the call originating communication device. SIP BYE message 234 results in error in case a far end party is not available for a call. It should also be noted that the call tracking engine 514 may analyze various events leading to SIP session state changes to identify one or more dropped calls. As a few non-limiting examples the evaluated events related to session refresh may include: (1) SIP_F—481—is an event whereby a 481 response is received for any in-dialog SIP transaction; (2) SIP_F—is an event whereby a SIP session refresh interval expires without completion of a successful refresh; (3) SIP_T_E—is an event whereby a SIP in-dialog transaction timeout or error occurs (e.g., >2xx response, except 481); and (4) SIP_OK—is an event whereby a SIP session is refreshed successfully.

As noted above, the call tracking engine 514 may map call control or call data attributes to a specific QCI value. This mapping of QCI values to specific types can be used by the call tracking engine 514 to determine the number and type of calls that are being dropped. Different bearer traffic requires different QCI values. For example, the VoLTE QCI 1 requirements include a Packet Delay Budget (PDB) which defines an upper bound for the time that a packet may be delayed between the UE and the Policy and Charging Enforcement Function (PCEF). In addition, location information (cell ID and tracking area), specific user information (e.g., User ID parameter values) and phone type information can be included as part of the overall analysis performed at step 604 by the call tracking engine 514 that will allow different ASI data statistics to be calculated and viewed by a user to help understand different call drop scenarios. In one embodiment, in step 604, the call tracking engine 514 may generate events in tables described below in conjunction with step 605 from the specific call drop messages defined below with the given attributes based E-RAB QCI values when detecting a dropped scenario to help determine aggregate quality indication information.

Next, at step 605, the call tracking engine 514 analyzes S1-AP signaling messages associated with calls being made or attempted in the wireless communication system 100 for a specified period of time to identify one or more dropped calls. These messages are exchanged between the eNodeB 102 and the MME 108 over the S1-MME interface 124. As noted above, the MME 108 is a key node in the control plane that is involved in the bearer activation/deactivation process and is also responsible for authenticating the user. In an LTE network, a packet data session is called an Evolved Packet System (EPS) bearer. A bearer is a packet flow that is established between the PGW 112 and a UE. Each UE (e.g., UE 106) is allocated a default Evolved Packet System bearer upon initial attach. This default bearer provides connectivity, but with nominal expected Quality of Service. If stricter Quality of Service parameters are desired for a particular application, the UE 106 may establish additional bearers, called dedicated Evolved Packet System bearers. A dedicated Evolved Packet System bearer may be associated with stricter Quality of Service parameters. A bearer is the level of granularity for bearer-level Quality of Service control. The network traffic that runs across a bearer can be further sub-divided into data flows for even greater granularity. A data flow may be a single packet flow (e.g., for a single application or application function). Thus, in one embodiment, at step 605, the call tracking engine 514 may track and analyze bearer related events, such as, but not limited to creation/modification/deletion of each bearer described above and may analyze any errors associated with these bearer related events.

As noted above, S1-MME 124 is the interface by which eNodeBs 102a-102b communicate with the MME 108 using the S1-AP protocol. In one embodiment, the following S1-AP messages may be used by the call tracking engine 514 to identify dropped calls: INITIAL CONTEXT SETUP RESPONSE, INITIAL CONTEXT SETUP FAILURE, E-RAB SETUP RESPONSE, UE CONTEXT MODIFICATION FAILURE, E-RAB MODIFY RESPONSE, HANDOVER REQUEST ACKNOWLEDGE, HANDOVER PREPARATION FAILURE, HANDOVER COMMAND, HANDOVER FAILURE, PATH SWITCH REQUEST ACKNOWLEDGE, PATH SWITCH REQUEST FAILURE, E-RAB RELEASE COMMAND, E-RAB RELEASE RESPONSE, E-RAB RELEASE INDICATION and UE CONTEXT RELEASE REQUEST. As a non-limiting example, when the UE 106 is in the idle mode, the MME 108 sends the eNodeB 102 an S1 initial context setup request message. When the UE 106 is in the connected mode, the MME 108 sends the eNodeB 102 a S1 AP UE context modify request message. During handover procedure between different eNodeB's 102, when the handover is finished, the source eNodeB (e.g., a first eNodeB 102a) sends an S1-AP UE context release message (S1 UE context release request message), so as to indicate to the gateway of the source eNodeB to release the context of the handover UE.

An E-RAB setup request 220 (shown in FIG. 2) comprises UE's 106 connection setup request. In accordance with the E-RAB modify procedure, the MME 108 sends an E-RAB modify request message to the eNodeB 102 that contains information required by the eNodeB 102 to modify one or several E-RABs of the existing E-RAB configuration. Upon reception of an E-RAB modify request message, and if resources are available for the requested configuration, the eNodeB 102 executes the modification of the requested E-RAB configuration, modifying for each identified E-RAB the data radio bearer configuration and changing the allocation of resources on the Uu 104 and S1-MME 124 interfaces. The E-RAB release message 238 may be sent, for example, to release failed E-RABs. A path switch request message may be sent during a handover procedure. The target eNodeB (e.g., a second eNodeB 134b) can send a path switch request message to the MME 106 to inform the UE 101 that the UE 101 has changed cells. The path switch request message 408 (shown in FIG. 4) can be sent for each E-RAB with the source eNodeB 102a. A handover preparation message may be a handover required message in case of a S1 handover procedure and is typically sent by the source eNodeB 102a. A resource allocation request message is typically used for allocating resources for a handover procedure. By analyzing one or more messages described above and by analyzing responses and error codes associated with these messages the call tracking engine 514 may identify specific reason(s) for each identified dropped call.

According to an embodiment of the present invention, the call tracking engine 514 is configured to parse S1-AP messages and tracks S1-AP sessions information corresponding to such S1-AP messages. As part of S1-AP session tracking, the call tracking engine 514 maintains the E-RAB QCI values for each E-RAB associated with a particular S1-AP session. In addition, the call tracking engine 514 may provide benefits of differentiating and grouping various QCI values. For example, at least one group can be mapped according to voice bearer based on QCI values equal to 1. At least one another group can be mapped according to IMS control based on QCI values equal to 5. Furthermore, the call tracking engine 514 can create other groups different from voice bearer and IMS control groups using various combinations of QCI values. In an embodiment of the present invention, the call tracking engine 514 may track different attributes for the S1-AP messages including, but not limited to, International Mobile Subscriber Identity (IMSI), cell Id, International Mobile Equipment Identity (IMEI), Tracking Area Identity (TAI), E-NodeB identity, and the like.

More specifically, the following tables illustrate examples of messages that could be analyzed by the call tracking engine 514 during call setup, modify, handover and release. Call drops during call setup can occur when a call is being setup and the E-RAB that is being created for the given QCI will not be able to be created. In one embodiment, for call setup E-RAB S1-AP messages, the call tracking engine 514 may be implemented to track and report successful setups and failures per E-RAB per QCI group. Table 1 bellow illustrates S1-AP messages indicative of call drop occurrence that may be analyzed by the call tracking engine 514 in step 605:

TABLE 1

| S1-AP Message | Error Code |
| --- | --- |
| INITIAL CONTEXT SETUP RESPONSE | E-RAB Failed to Setup List::Cause |
| INITIAL CONTEXT SETUP FAILURE | Cause (report same cause code for all active bearers) |
| E-RAB SETUP RESPONSE | E-RAB Failed to Setup List::Cause |

Call drop during Modify procedure occurs when a call is being moved to a QCI value that is one of the attribute values defined and cannot be completed. In one embodiment, for call drop occurrences related to Modify procedure, the call tracking engine 514 can track and report successful modifications and failures per E-RAB per QCI group. Table 2 bellow illustrates S1-AP messages indicative of call drop occurrence related to Modify procedure that may be analyzed by the call tracking engine 514 in step 605:

TABLE 2

| S1-AP Message | Error Code |
| --- | --- |
| UE CONTEXT MODIFICATION FAILURE | Cause (report same cause code for all active bearers) |
| E-RAB MODIFY RESPONSE | E-RAB Failed to Modify List::Cause |

Call drop during handover in a network node occurs when an E-RAB is not created at the destination eNodeB 102b/MME 108 during the handover or when the complete handover fails. Handover failures can be detected at the source or target nodes. A handover can still be completed but does not require all E-RABs established. If a particular call E-RAB cannot be established the call will be dropped by the network. In one embodiment, for call handover S1-AP messages, the call tracking engine 514 may be implemented to track and report successful handovers and failures per E-RAB per QCI group. Table 3 bellow illustrates S1-AP messages indicative of call drop occurrence related to handover procedure that may be analyzed by the call tracking engine 514 in step 605:

TABLE 3

| S1-AP Message | Error Code |
| --- | --- |
| HANDOVER REQUEST ACKNOWLEDGE | E-RABs Failed to Setup List::Cause |
| HANDOVER PREPARATION FAILURE | Cause (report same cause code for all active bearers) |
| HANDOVER COMMAND | E-RABs to Release List::Cause |
| HANDOVER FAILURE | Cause (report same cause code for all active bearers) |
| PATH SWITCH REQUEST ACKNOWLEDGE | E-RAB To Be Released List::Cause |
| PATH SWITCH REQUEST FAILURE | Cause (report same cause code for all active bearers) |

Call drop occurring during abnormal E-RAB release or UE context release procedures due to an error will be indicated in the error code. Certain error codes correspond to normal E-RAB releases and will not be considered normally by the call tracking engine 514 as call drops including, but not limited to: CS Fallback Triggered, Normal Release, etc. In one embodiment, for both E-RAB release and UE context release S1-AP messages, the call tracking engine 514 may be implemented to track and report successful releases and failures per E-RAB per QCI group. Table 4 bellow illustrates S1-AP messages indicative of call drop occurrence related to release procedure that may be analyzed by the call tracking engine 514 in step 605:

TABLE 4

| S1-AP Message | Error Code |
| --- | --- |
| E-RAB RELEASE COMMAND | E-RAB To Be Released List::Cause |
| E-RAB RELEASE RESPONSE | E-RAB Failed to Release List::Cause |
| E-RAB RELEASE INDICATION | E-RAB Released List::Cause |
| UE CONTEXT RELEASE REQUEST | Cause (report same cause code for all active bearers) |

In summary, according to an embodiment of the present invention, the call tracking engine 514 analyzes S1-AP signaling to identify dropped calls by evaluating a combination of a type of received S1-AP message, QCI value classification indicative of a type of a call (voice, control or other) and corresponding error codes. This combined information enables the call tracking engine 514 to determine whether and when a call drop event has been detected at different stages of a live call. In other words, the call tracking engine 514 can analyze different groups and different S1-AP messages to determine overall call drops or call drops from different stages of the call and/or while the user is moving. It should be noted that in various embodiments, the call tracking engine 514 may perform only one of the steps 604 and 605 depending on implementation.

Next, at step 606, the call tracking engine 514 analyzes at least one of SIP signaling error codes and S1-AP signaling cause codes associated with the one or more identified dropped calls to further identify one or more call drop reasons. Typically, only few of errors coming over SIP protocol communication messages (e.g., BYE messages 234) can be attributed towards dropped call scenarios. It should be noted that the SIP BYE request message 234 may comprise, for example, the location-specific SIP error code as a SIP reason header and may additionally comprise the error reporting header and optional body as defined by the standard RFC 6442. In other words, the reason header may be carried in a SIP request message, and in particular a SIP BYE request 234. Furthermore, the SIP protocol provides additional optional information called status code (e.g. status code 503 "Service Unavailable", status code 480 "Temporarily Unavailable") which may be included either in SIP response messages or reason header fields. Therefore, an SIP BYE request 234 transmitted between various components of the wireless system 100 as a consequence of radio link failure includes, according to the preferred embodiment of the invention, a reason header which carries a status code indicating to a user that a radio link failure event has most likely occurred. Therefore, the presence of the certain reason headers with an appropriate status code in a SIP BYE request 234 is interpreted by the call tracking engine 514 as an implicit notification of a dropped call. For instance, a reason header may contain information regarding the reason for issuing a particular SIP BYE request. Thus, reason code for such SIP BYE messages 234 contains useful information regarding call drops. Also, reason code errors are informational errors which may contain vendor specific errors. Responsive to the reception and processing of such SIP BYE requests 234 with a reason header and a status code, the call tracking engine 514 may take additional steps required for determining of one or more call drop reasons associated with each of the identified dropped calls. According to an embodiment of the present invention, the call tracking engine 514 may keep track of a rate of dropped calls in a user-specified time period using the following formula (1):

# of Dropped Calls=# of failed BYE messages+# of timeouts associated with BYE messages+ (1)

# of reason codes associated with BYE failure response messages;

It should be noted that in most or all cases, the call tracking engine 514 may also generate events for each successful call setup/handover/release for each call. To keep track of the rate of dropped calls in formula (1), percentage of call drops, etc., the call tracking engine 514 may use data in the tables above during various time durations of various call paths based on certain types of calls, drops due to setup/handover, based on error codes, going to certain locations, etc.

According to an embodiment of the present invention, next, at step 608, the call tracking engine 514 may generate an ASI data set based on the analysis performed in steps 604-606. For instance, bearers related with a voice call can be identified by QoS requested using the QCI value. It should be noted that multiple bearers may each correspond to different link layer QoS levels. In the context of an LTE network, a link layer QoS level may be referred to as a QCI. As a non-limiting example, one bearer may correspond to QCI 1, one bearer may correspond to QCI 7, and one bearer may correspond to QCI 8. Each bearer related KPI can be identified as VoLTE KPI and tagged in the ASI dataset.

As noted above, the ASI data set provides performance metadata with analysis granularity required to extract rich network, service- and user-related metrics on devices, subscribers, base station ID, VLAN, etc. This data set may be labeled with a time period. In one embodiment, the generated data set may correspond to a one hour time period. The ASI data set may include, among others, metrics of various types related to various network nodes. Such metric ASI data may be sampled by the call tracking engine 514 at certain time intervals. These samples may be taken, for example, at five twelve minute intervals. Each data set may contain information about some metric, e.g. call drop rate or calls placed, at the sample time that the data set is captured. ASI metrics can track E-RABs during the different stages of E-RAB existence (Setup procedure 212, Handover procedures 401 and 411, Modify bearer procedures 418 and Release procedures 420). The call tracking engine 514 provides a mechanism to map a call control or call data attributes of the ASI data to a specific QCI value. The ASI data attributes can be further qualified by the call tracking engine 514 into the type of data (including, e.g., voice, video, etc.).

The ASI dataset may further provide additional information related to one or more dropped calls. Furthermore, at step 608, the call tracking engine 514 may present the generated ASI data set to a user via a Graphical User Interface (GUI), for example. The call tracking engine 514 may align data from different sources with a uniform time coding system so that ASI dataset values can be normalized to whatever time interval the users choose to display, so that users can drill down from the aggregated KPI data to individual dropped calls. The updated ASI data set enables users to monitor any call drops of radio voice calls happening in the wireless network 100 due to a radio signal drop or mobility reasons, for example.

Advantageously, the various embodiments described herein provide more efficient monitoring of network traffic transmitted over access interfaces in legacy communication networks, as well as traffic transmitted over the S1 interface in a modern (LTE) network. Certain discrete monitoring identification criteria are used to identify dropped calls in such wireless computer networks. Non-limiting examples of such criteria may include specific SIP signaling messages associated with calls being made or attempted in the wireless communication system and may include SIP signaling error codes associated with the identified dropped calls. In the aforementioned embodiments, to enable uniform monitoring and troubleshooting of various dropped call scenarios, one or more of monitoring devices monitor all signaling messages, selectively monitor signaling error codes and messages transmitted over access interfaces terminating into the core network and update the ASI dataset based on the analyzed information. The updated ASI dataset enables users to perform at least one of the following: determining a rate of dropped calls, performing root cause analysis within the boundary of the ASI dataset for dropped call scenario using session drills. Furthermore, the presented ASI dataset enables users to acquire sufficient information by drilling down to individual call drop sessions or even drilling down to individual packets for selected error codes and dropped calls, respectively.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for tracking a status of a call in a wireless communication system including an eNodeB and a Mobile Management Entity (MME), the method comprising steps of:

receiving, by a processor, a plurality of data packets from the wireless communication system;

analyzing, by a processor, S1-Application Protocol (S1-AP) signaling messages exchanged between the eNodeB and the MME over a first interface for the specified time period and analyzing bearer related events and one or more error codes associated with the bearer related events, the S1-AP signaling messages associated with live calls being made or attempted in the wireless communication system to identify one or more dropped calls;

tracking S1-AP session information corresponding to the analyzed S1-AP messages, wherein each tracked S1-AP session maintains one or more E-Radio Access Bearer (E-RAB) QoS class identifiers (QCI) values for each E-RAB associated with the S1-AP session;

analyzing, by a processor, S1-AP signaling cause codes associated with the one or more identified dropped calls to identify one or more call drop reasons; and generating, by a processor, an Adaptive Session Intelligence (ASI) data set based on the combined analysis of the S1-AP signaling messages, one or more QCI values and of the S1-AP signaling cause codes, wherein the ASI data set includes one or more metrics indicative of E-RAB status at different stages of a corresponding live call.

2. The method of claim 1, wherein the step of analyzing the S1-AP signaling messages comprises partitioning the E-RAB QCI values into a plurality of groups.

3. The method of claim 2, wherein the step of analyzing the S1-AP signaling messages comprises analyzing at least one of the following messages: INITIAL CONTEXT SETUP RESPONSE, INITIAL CONTEXT SETUP FAILURE, E-RAB SETUP RESPONSE, UE CONTEXT MODIFICATION FAILURE, E-RAB MODIFY RESPONSE, HANDOVER REQUEST ACKNOWLEDGE, HANDOVER PREPARATION FAILURE, HANDOVER COMMAND, HANDOVER FAILURE, PATH SWITCH REQUEST ACKNOWLEDGE, PATH SWITCH REQUEST FAILURE, E-RAB RELEASE COMMAND, E-RAB RELEASE RESPONSE, E-RAB RELEASE INDICATION and UE CONTEXT RELEASE REQUEST.

4. The method of claim 2, wherein the step of analyzing the S1-AP signaling messages comprises tracking a plurality of S1-AP attributes comprising International Mobile Subscriber Identity (IMSI), cell Id, International Mobile Equipment Identity (IMEI), Tracking Area Identity (TAI) and E-NodeB identity.

5. The method of claim 3, wherein the step of analyzing the messages further comprises tracking success and failure metrics for each of the plurality of groups.

6. The method of claim 5, wherein the plurality of groups comprises at least a voice bearer group.

7. A network device for tracking a status of a call in a wireless communication system, the network device comprising:
   a network interface configured to receive program instructions to receive a plurality of data packets from the wireless communication system; and
   a call tracking engine configured to:
   analyze S1-Application Protocol (S1-AP) signaling messages exchanged between the eNodeB and the MME over a first interface for the specified time period and analyzing bearer related events and one or more error codes associated with the bearer related events, the S1-AP signaling messages associated with live calls being made or attempted in the wireless communication system to identify one or more dropped calls;
   track S1-AP session information corresponding to the analyzed S1-AP messages, wherein each tracked S1-AP session maintains one or more E-Radio Access Bearer (E-RAB) QoS class identifiers (QCI) values for each E-RAB associated with the S1-AP session;
   analyze S1-AP signaling cause codes associated with the one or more identified dropped calls to identify one or more call drop reasons; and
   generate an Adaptive Session Intelligence (ASI) data set based on the combined analysis of the S1-AP signaling messages, one or more QCI values and of the S1-AP signaling cause codes, wherein the ASI data set includes one or more metrics indicative of E-RAB status at different stages of a corresponding live call.

8. The network device of claim 7, wherein the call tracking engine configured to analyze the S1-AP signaling messages is further configured to partition the E-RAB QCI values into a plurality of groups.

9. The network device of claim 8, wherein the call tracking engine configured to analyze the S1-AP signaling messages exchanged between the eNodeB and the MME is further configured to analyze at least one of the following messages: INITIAL CONTEXT SETUP RESPONSE, INITIAL CONTEXT SETUP FAILURE, E-RAB SETUP RESPONSE, UE CONTEXT MODIFICATION FAILURE, E-RAB MODIFY RESPONSE, HANDOVER REQUEST ACKNOWLEDGE, HANDOVER PREPARATION FAILURE, HANDOVER COMMAND, HANDOVER FAILURE, PATH SWITCH REQUEST ACKNOWLEDGE, PATH SWITCH REQUEST FAILURE, E-RAB RELEASE COMMAND, E-RAB RELEASE RESPONSE, E-RAB RELEASE INDICATION and UE CONTEXT RELEASE REQUEST.

10. The network device of claim 8, wherein the call tracking engine configured to analyze the S1-AP signaling messages is further configured to track a plurality of S1-AP attributes comprising International Mobile Subscriber Identity (IMSI), cell Id, International Mobile Equipment Identity (IMEI), Tracking Area Identity (TAI) and E-NodeB identity.

* * * * *